United States Patent
McGrogan et al.

(10) Patent No.: US 9,067,598 B2
(45) Date of Patent: Jun. 30, 2015

(54) METHOD AND APPARATUS FOR CONTROLLING A HIGH-VOLTAGE ELECTRICAL SYSTEM FOR A MULTI-MODE TRANSMISSION

(75) Inventors: Sean W. McGrogan, Ann Arbor, MI (US); Anthony H. Heap, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 268 days.

(21) Appl. No.: 13/517,889

(22) Filed: Jun. 14, 2012

(65) Prior Publication Data
US 2013/0334997 A1 Dec. 19, 2013

(51) Int. Cl.
| | |
|---|---|
| H02K 17/32 | (2006.01) |
| H02K 23/68 | (2006.01) |
| H02K 27/30 | (2006.01) |
| H02P 1/00 | (2006.01) |
| H02J 7/00 | (2006.01) |
| B60W 20/00 | (2006.01) |
| B60W 10/08 | (2006.01) |
| B60K 6/445 | (2007.10) |
| B60L 3/00 | (2006.01) |
| B60L 7/14 | (2006.01) |
| B60L 11/12 | (2006.01) |
| B60L 11/14 | (2006.01) |
| B60L 15/20 | (2006.01) |
| B60K 6/34 | (2007.10) |

(52) U.S. Cl.
CPC ............... *B60W 20/20* (2013.01); *B60W 10/08* (2013.01); *B60K 6/34* (2013.01); *B60K 6/445* (2013.01); *B60W 2710/086* (2013.01); *B60Y 2400/3086* (2013.01); *Y02T 10/6239* (2013.01); *B60L 3/0046* (2013.01); *B60L 7/14* (2013.01); *B60L 11/123* (2013.01); *B60L 11/14* (2013.01); *B60L 15/2009* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/545* (2013.01); *B60L 2240/547* (2013.01); *B60L 2240/549* (2013.01); *B60L 2250/26* (2013.01); *Y02T 10/7077* (2013.01); *Y02T 10/7005* (2013.01); *Y02T 10/7241* (2013.01); *Y02T 10/7275* (2013.01); *Y02T 10/6217* (2013.01); *Y02T 10/642* (2013.01)

(58) Field of Classification Search
CPC ...................................................... H02K 17/32
USPC ......................................................... 318/139
See application file for complete search history.

(56) References Cited

U.S. PATENT DOCUMENTS

| | | | |
|---|---|---|---|
| 2004/0034460 A1* | 2/2004 | Folkerts et al. ................. | 701/54 |
| 2009/0115353 A1* | 5/2009 | Heap et al. ....................... | 318/8 |

(Continued)

*Primary Examiner* — Paul Ip
*Assistant Examiner* — Devon Joseph (57) ABSTRACT

A multi-mode transmission for a powertrain system includes a high-voltage electrical system with a high-voltage battery and high-voltage electrical bus coupled to a power inverter electrically coupled to torque machines configured to transform electric power to torque. A method for controlling the multi-mode transmission includes monitoring voltage and current on the high-voltage electrical bus, and estimating electric power limits for the high-voltage electric bus including a constrained battery power command based upon a total motor torque electrical power for the torque machines. Torque commands for the torque machines are constrained in response to the estimated electric power limits for the high-voltage electric bus. Operation of the torque machines of the multi-mode transmission is controlled in response to the torque commands for the torque machines.

19 Claims, 3 Drawing Sheets

(56) References Cited

U.S. PATENT DOCUMENTS

| | | |
|---|---|---|
| 2009/0118077 A1* | 5/2009 | Hsieh et al. ............... 477/3 |
| 2009/0118964 A1* | 5/2009 | Snyder et al. ............. 701/99 |
| 2010/0174500 A1* | 7/2010 | Plett ........................... 702/63 |
| 2011/0070991 A1* | 3/2011 | Wu et al. .................... 475/5 |
| 2011/0209929 A1* | 9/2011 | Heinzmann et al. ...... 180/6.2 |
| 2012/0303189 A1* | 11/2012 | Namuduri et al. ......... 701/22 |

* cited by examiner

METHOD AND APPARATUS FOR CONTROLLING A HIGH-VOLTAGE ELECTRICAL SYSTEM FOR A MULTI-MODE TRANSMISSION

TECHNICAL FIELD

This disclosure is related to powertrain systems employing torque transmission devices, and dynamic system controls associated therewith.

BACKGROUND

The statements in this section merely provide background information related to the present disclosure. Accordingly, such statements are not intended to constitute an admission of prior art.

Known powertrain systems are configured to transfer torque from a torque-generative device through a transmission device to an output member coupled to a driveline. Some powertrain systems may be configured to transfer torque originating from multiple torque-generative devices through a multi-mode transmission device to an output member coupled to a driveline. Such powertrain systems include hybrid powertrain systems and extended-range electric vehicle systems. Control systems for operating such powertrain systems control the torque-generative devices and apply selected torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that operate as motors or generators to generate torque input to the transmission in combination with or independently of torque input from the internal combustion engine. The torque machines may react torque, i.e., transform vehicle kinetic energy transferred through the vehicle driveline to electrical energy that is storable in an electrical energy storage device in what is referred to as a regenerative operation. A control system monitors inputs from the vehicle and the operator and provides operational control of the powertrain, including controlling an engine on/off state, controlling a transmission operating state, controlling the torque-generative devices, and regulating electrical power flow between the electrical energy storage device and the electric machines to manage transmission operation including torque and rotational speed.

Control of a powertrain system includes controlling in a manner that avoids overshoot of electrical power flow, including either electric current or electric voltage from the electrical energy storage device in order to prevent operation which may reduce service life. Known electrical power control systems employ feedback mechanisms to respond to and control operation to minimize overshoot during ongoing operation.

SUMMARY

A multi-mode transmission for a powertrain system includes a high-voltage electrical system with a high-voltage battery and high-voltage electrical bus coupled to a power inverter electrically coupled to torque machines configured to transform electric power to torque. A method for controlling the multi-mode transmission includes monitoring voltage and current on the high-voltage electrical bus, and estimating electric power limits for the high-voltage electric bus including a constrained battery power command based upon a total motor torque electrical power for the torque machines. Torque commands for the torque machines are constrained in response to the estimated electric power limits for the high-voltage electric bus. Operation of the torque machines of the multi-mode transmission is controlled in response to the torque commands for the torque machines.

BRIEF DESCRIPTION OF THE DRAWINGS

One or more embodiments will now be described, by way of example, with reference to the accompanying drawings, in which.

DETAILED DESCRIPTION

Figure 1:
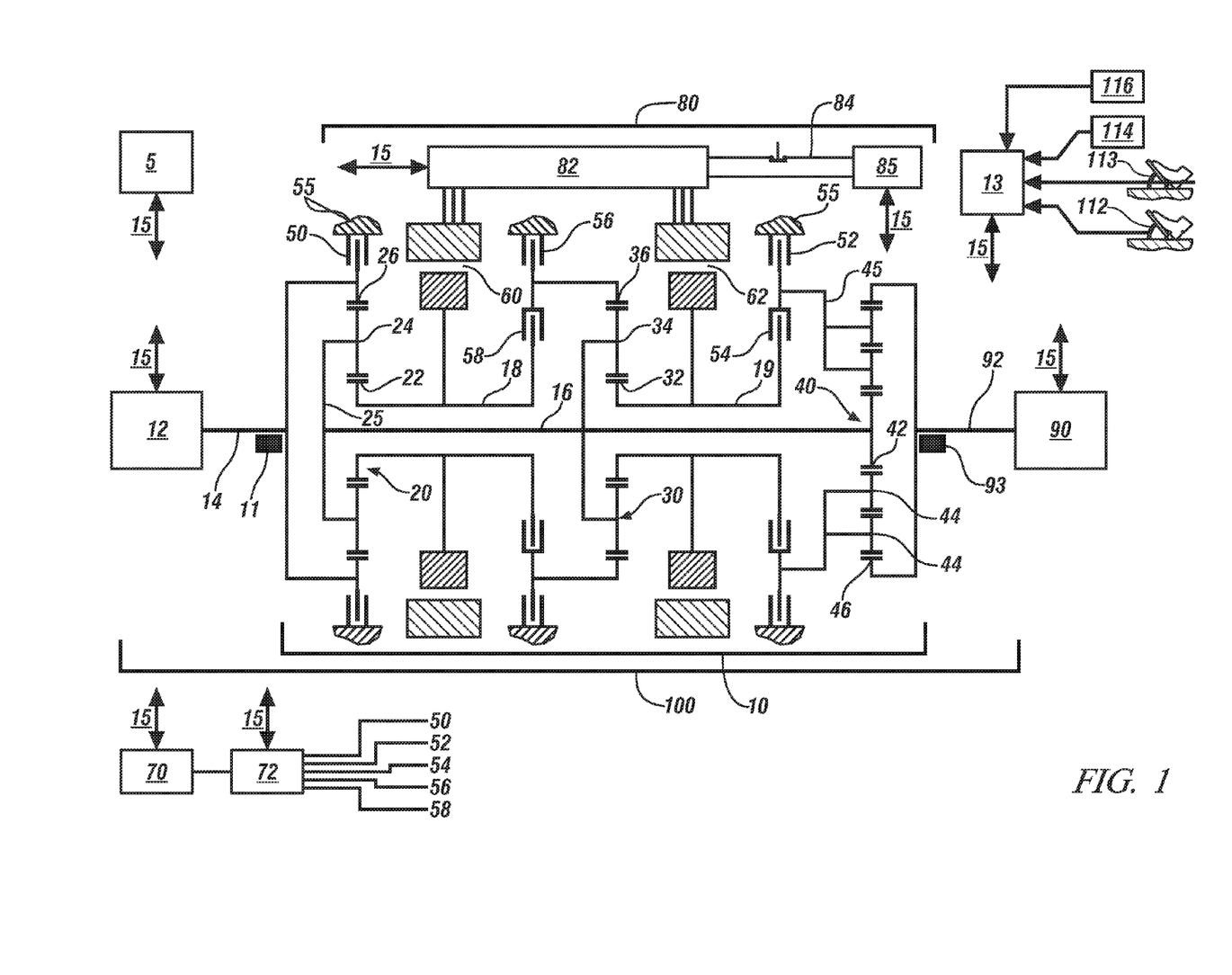
FIG. 1 illustrates a powertrain system including an internal combustion engine, a multi-mode transmission, a high-voltage electrical system, a driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62 respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed multiplied by engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, and band clutches. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board rountines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (ESD) 85. The ESD 85 is high voltage DC-coupled to the TPIM 82 via the high-voltage electrical bus 84 that preferably include a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the ESD 85 to charge and discharge the ESD 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of ESD 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of ranges of the transmission 10 and engine states of on and off. When the engine is in the off state, it is unfueled, not firing, and is not spinning. When the engine is in the on state it is fueled, firing, and spinning. The engine may also operate in a fuel cutoff mode, wherein it is spinning but is unfueled and not firing. The transmission 10 is configured to operate in one of a plurality of neutral (neutral), fixed gear (Gear #), variable mode (EVT Mode #), electric vehicle (EV#) and transitional (EV Transitional State # and pseudoGear #) states by selectively activating the clutches C1 150, C2 152, C3 154, C4 156, and CS 158. A pseudoGear state is a variable mode state in which torque output from the transmission is directly proportional to input torque from the engine, and is primarily employed during shifts between EVT modes. Table 1 depicts a plurality of powertrain states including transmission states and engine states for an embodiment of the powertrain 100.

TABLE 1

| Steady State Range | Engine State | Clutches | | | | |
|---|---|---|---|---|---|---|
| | | C1 | C2 | C3 | C4 | C5 |
| Neutral | on/off | | | | | |
| Neutral | on/off | | | x | | |
| Neutral | on/off | | | | x | |
| pseudoGear 1 | on/off | x | | | | |
| pseudoGear 2 | on/off | | x | | | |
| Neutral | off | | | | | x |
| EVT Mode 1 | on/off | x | | x | | |
| EVT Mode 2 | on/off | x | | | x | |
| EVT Mode 3 | on/off | | x | | x | |
| EVT Mode 4 | on/off | | x | x | | |
| EVT Transitional State 1 | off | x | | | | x |
| EVT Transitional State 2 | off | | x | | | x |
| Gear 1 | on | x | | x | x | |
| Gear 2 | on | x | x | | x | |
| Gear 3 | on | | x | x | x | |
| EV1 (Electric Vehicle 1) | off | x | | x | | x |
| EV2 (Electric Vehicle 2) | off | x | | | x | x |
| EV3 (Electric Vehicle 3) | off | | x | | x | x |
| EV4 (Electric Vehicle 4) | off | | x | x | | x |
| EV Transitional State 3 | off | x | x | | | x |
| Neutral | on/off | | | x | x | |
| pseudoGear 3 | on/off | x | x | | | |
| Neutral | off | | | x | | x |
| Neutral | off | | | | x | x |

Figure 2:
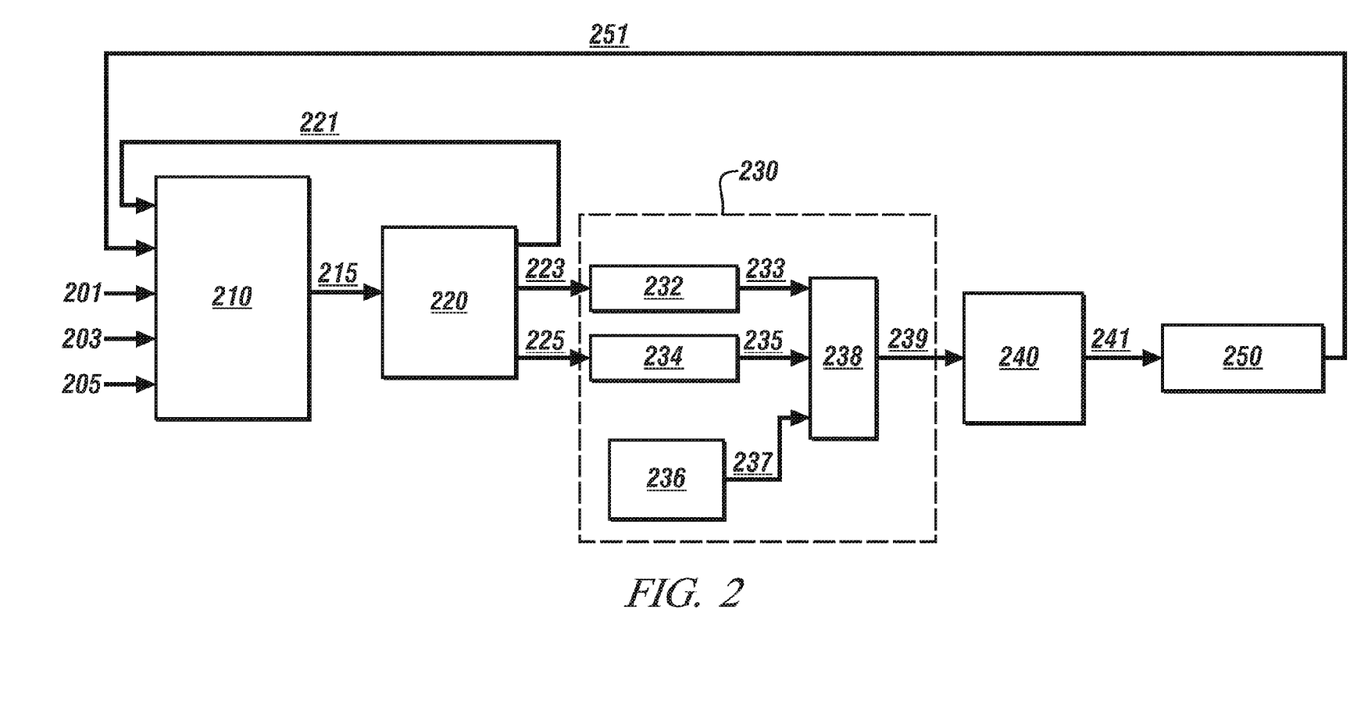
FIG. 2 illustrates a control scheme for controlling a high-voltage electrical system used in operation of a multi-mode transmission that employs torque machines that transform electric power to torque, in accordance with the disclosure.

FIG. 2 schematically shows a control scheme 200 for controlling a high-voltage electrical system including a high-voltage battery that is employed in a multi-mode transmission that employs torque machines that transform electric power to torque. The control scheme 200 is described with reference to the powertrain system 100 including the multi-mode transmission 10 of FIG. 1. The disclosure applies to any other powertrain system employing a high-voltage electrical system that supplies electric power to one or more electrically-powered torque machines.

The control scheme 200 employs feed-forward control schemes with feedback that operate to reduce the likelihood of battery voltage or current limit overshoot on a high-voltage battery, e.g., the ESD 85 described with reference to FIG. 1. The control scheme 200 employs voltage and current feedback and a model characterizing the high-voltage battery to determine a minimum or maximum commanded battery power that places the voltage or current at a corresponding voltage or current limit. This includes a voltage-limited maximum commanded battery power, a voltage-limited minimum commanded battery power, a current-limited maximum commanded battery power, and a current-limited minimum commanded battery power.

The control scheme 200 periodically estimates the state of the minimum or maximum commanded battery power by performing a local expansion about the current operating point, i.e., the current estimated battery power and one of the measured voltage or measured current. As voltage [current] approaches the voltage [current] limit, the estimate converges to the current estimated battery power limit, which is actual battery power limit in the estimated electrical power domain. The control scheme 200 precludes a need to observe an overshoot of a battery power limit, i.e., one of a voltage limit and a current limit, before reacting to it. This operation increases robustness to errors between the minimum or maximum commanded battery power and the power on the high-voltage electrical bus 84 corresponding to the voltage or current limit, as well as increasing robustness to errors between the minimum or maximum commanded battery power and the power on the high-voltage electrical bus 84. It reduces the likelihood of a voltage or current limit overshoot, thus increasing the likelihood that the system will satisfy its voltage and current limit overshoot requirements. Furthermore, other closed-loop routines may be more closely controlled because less burden is placed on them to aggressively modify torque output(s) of one or both of the first and second torque machines 60, 62 and the engine 12 in response to occurrence of a voltage or current overshoot on the high-voltage electrical bus 84.

The control scheme 200 employs an electric power model 210 that iteratively estimates electrical power limits including a constrained battery power command 215 based upon a total motor torque electrical power 221 for the first and second torque machines 60, 62. The constrained battery power command 215 includes one of a voltage-limited maximum commanded battery power, a voltage-limited minimum commanded battery power, a current-limited maximum commanded battery power, and a current-limited minimum commanded battery power. The constrained battery power command 215 is employed in a torque module 220 to determine first and second motor torque commands Ta 223 and Tb 225 for the first and second torque machines 60, 62, respectively, that are constrained based thereon. The torque module 220 calculates the total motor torque electrical power 221 for the first and second torque machines 60, 62 corresponding to the first and second motor torque commands Ta 223 and Tb 225 based upon models of electric power for the first and second torque machines 60, 62. The total motor torque electrical power 221 is provided as feedback to the electric power model 210 to iteratively estimate the aforementioned electrical power limits. The first and second motor torque commands Ta 223 and Tb 225 are communicated to respective motor control modules 232 and 234 of the TPIM 82 to determine corresponding electric power commands 233 and 235. An auxiliary power module 236 is employed to provide high-voltage electrical power to various powertrain and vehicle accessories, and accessory loads 237 are determined using known monitoring and estimating schemes. An adding device 238 arithmetically adds the electric power commands 233 and 235 and the accessory loads 237 to determine a battery power demand 239 for battery pack 240, e.g., ESD 85 shown in FIG. 1, and determine a corresponding battery pack voltage 241 based thereon. Sensing hardware 250 is configured to monitor voltage and electric current on the high-voltage electrical bus 84, including bus voltage V 251, which is provided as feedback to the electric power model 210 for iteratively estimating the electrical power limits.

During ongoing operation of the powertrain system, operating parameters related to the high-voltage electric system 80 are determined. This includes monitoring the bus voltage V 251 and calculating the total motor torque electrical power 221 commanded during the previous iteration of the control scheme 200 based upon electric power models of the motors and inverters. A voltage limit Vlim 201, i.e., one of an overvoltage limit and an under-voltage limit, is determined by monitoring the electrical power output of the ESD 85 and taking into account state-of-charge, temperature, cell-level variations in voltage and other factors affecting a state of health of the ESD 85. Parameters of the ESD 85 including an internal resistance R 203 and an open-circuit voltage Voc 205 are estimated and provided to the electric power model 210.

The electric power model 210 estimates the value of the battery power command that will place either the battery voltage at the voltage limit or the battery current at the current limit by executing a local expansion about the present bus voltage operating point, i.e., bus voltage V 251. This allows operation at the constrained battery power command 215 while avoiding a condition on the high-voltage electrical bus 84 that leads to either a voltage overshoot condition or a current overshoot condition at the ESD 85.

The electric power model 210 develops battery power P in relation to the bus voltage V and the bus current I, taking into account the internal resistance R and open-circuit voltage Voc of the high-voltage battery, in accordance with the following relationship(s).

$$P = V * I \qquad [1]$$
$$= I * (Voc - IR)$$
$$= I * Voc - I^2 * R$$
$$= V * ((Voc - V)/R)$$
$$= (1/R) * (V * Voc - V^2)$$

The final relationship, $(1/R)*(V*Voc-V^2)$, from [1] above can be subjected to a partial derivative analysis with respect to bus voltage V, as follows:

$$\frac{dP}{dV} = \frac{1}{R}(Voc - 2\ V) \qquad [2]$$

wherein the partial derivative of power P in relation to voltage V has units of electrical current.

The third relationship, $I*Voc-I^2*R$, from [1] above similarly can be subjected to a partial derivative analysis with respect to current I, as follows:

$$\frac{dP}{dI} = Voc - 2*I*R \qquad [3]$$
$$= 2*(Voc - I*R) - Voc$$

The partial derivative of power, P, in relation to current, I, can be rewritten by substituting V=Voc−I*R into EQ. 3 above as follows:

$$\frac{dP}{dI} = 2*V - Voc \qquad [4]$$

wherein the partial derivative of power P in terms of current I has units of electrical voltage.

When operating a system at a maximum discharge power, the change in power with respect to current and the change in power with respect to voltage are both zero. Thus, maximum discharging power, Pmax, can be calculated as follows, based upon the electric power model 210 of EQ. 1, which assumes that the system can be operated at Voc/2.

$$P_{max} = \frac{1}{4R}Voc^2 \qquad [5]$$

A minimum charging power may be calculated in a similar manner. It is appreciated that a minimum voltage limit (V Floor) may limit the discharge power before the maximum discharging power Pmax is broached.

The electric power model 210 executes a local expansion about the present voltage operating point using the relationships of the electric power model described in EQ. 1. In one embodiment the local expansion about the present voltage operating point is accomplished using a Taylor series expansion of the electric power model, which is a series expansion of a function about a point. The local expansion may be expressed as follows:

$$f(x) = \sum_0^\infty \frac{f^{(n)}(a)(x-a)^n}{n!} \qquad [6]$$

wherein f represents battery power P,
x is a voltage limit, and
a is the most recent measured voltage, referred to as the present voltage operating point, i.e., bus voltage V 251.
Thus, EQ. 6 may be expressed as follows.

$$P(V) = \sum_0^\infty \frac{P^{(n)}(V\lim)(V\lim - V)^n}{n!} \qquad [7]$$

The solution to the Taylor series expansion of the electric power model is as follows, calculating two terms of the Taylor series expansion.

$$P|_{v=v} = \frac{1}{R}(-V^2 + Voc*V) \qquad [8]$$

Thus, the constrained battery power command 215 including the voltage-limited maximum commanded battery power can be determined that places the bus voltage at the voltage limit by executing a local expansion about the present bus voltage operating point, i.e., bus voltage V 251 using the electric power model 210.

Figure 3:
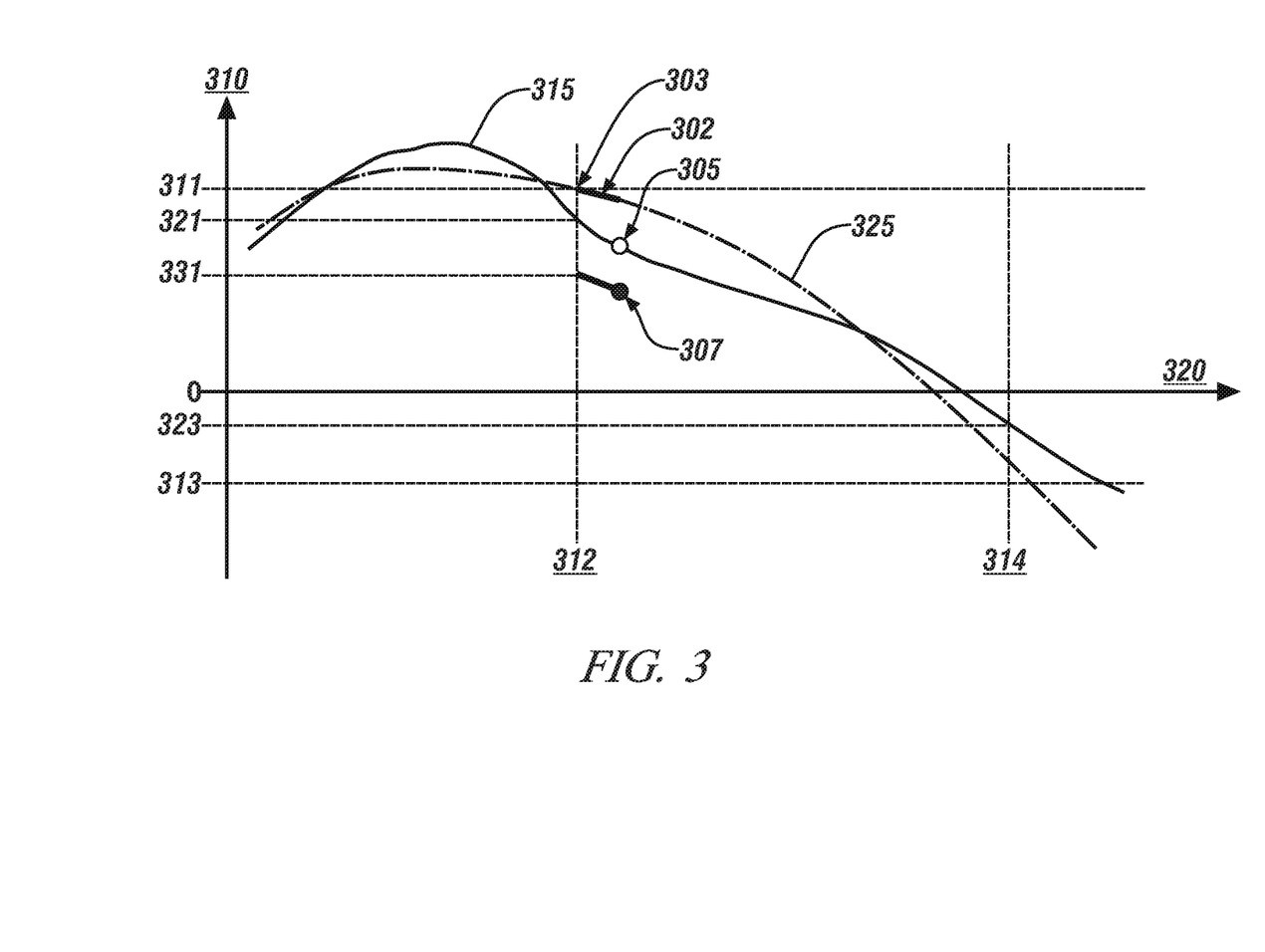
FIG. 3 illustrates relationships between battery power and pack voltage, including undervoltage limits and overvoltage limits in accordance with the disclosure.

FIG. 3 graphically shows relationships between battery power on the vertical-axis 310 in relation to voltage on the horizontal-axis 320. Voltage limits of the pack voltage 320 are shown, including an undervoltage limit 312 and an overvoltage limit 314.

A specific operating point is shown that includes a commanded battery power 307, which may differ from an actual bus power 305 due to latencies between monitoring and control, due to modeling errors of the motors and inverter, and due to errors in accessory load estimates. A first line 315 is characteristic of the actual bus power in relation to actual voltage. The first line may be difficult to estimate due to ongoing variations in operating conditions and the aforementioned latencies.

The actual battery power limits of the first line 315 are shown in relation to the pack voltage 320 in terms of a broadcasted maximum battery power 311 at the undervoltage limit 312 and a broadcasted minimum battery power 313 at the overvoltage limit 314. Naming convention includes positive battery power and power elements associated with electric discharging and negative battery power and power elements associated with electric charging.

The actual battery power limits of the first line 315 vary from the broadcasted battery power limits, and are shown in relation to the pack voltage 320, including an actual maximum battery power 321 at the undervoltage limit 312 and an actual minimum battery power 323 at the overvoltage limit 314. As shown, the actual minimum and maximum battery power limits 321 and 323 are more restrained than the broadcasted minimum and maximum battery power limits 311 and 313, thus a battery control system that operates in a powertrain system using the broadcasted minimum and maximum power limits has greater likelihood of overshooting the actual voltage limits.

The broadcasted maximum battery power 311 is shown at the undervoltage limit 312, intersecting at point 303. The control scheme 200 employs the aforementioned electric power model 210 to perform a local expansion about the commanded battery power at point 307, i.e., battery pack voltage 241 as described with reference to FIG. 2, with the results of the local expansion shown as line 325. Thus the local expansion shown as the model of line 325 around point 307 yields a voltage-limited maximum commanded battery power 331. The difference between the actual bus power 305 and the commanded battery power 307 is used with the slope of the line segment 302 to determine the voltage-limited maximum commanded battery power 331, which is shown at the point where the slope of the line segment 302 imposed upon the commanded battery power 307 intersects the undervoltage limit 312. The voltage-limited maximum commanded battery power 331 corresponds to the constrained battery power command 215 including the voltage-limited maximum battery power command described with reference to FIG. 2. The motor torque commands, e.g., the first and second motor torque commands Ta 223 and Tb 225 for the first and second torque machines 60, 62, respectively, are constrained based upon the voltage-limited maximum commanded battery power 331. A voltage-limited minimum commanded battery power may be similarly developed. Current-limited maximum and minimum commanded battery powers can also be similarly developed.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling torque machines of a multi-mode transmission, comprising:

monitoring voltage and current on a high-voltage electric bus electrically coupled to a high-voltage battery and a power inverter configured to transfer electric power to the torque machines and providing the monitored voltage and current as feedback to a control module including a feed-forward electric power model;

iteratively estimating electric power limits for the high-voltage electric bus using the feed-forward electric power model, the electric power limits including a constrained battery power command based upon total motor torque electrical power for the torque machines, wherein the feed-forward electric power model estimation of the constrained battery power command comprises:

developing a relationship of the power of the high-voltage battery to the monitored voltage and current on the high-voltage bus; and executing a local expansion about one of the voltage and current on the high-voltage electric bus using the developed relationship of the power of the high-voltage battery and the monitored voltage and current on the high-voltage bus to determine the constrained battery power command that will place said one of the voltage and current on the high-voltage bus at a corresponding limit;

determining torque commands for the torque machines that are constrained in response to the estimated electric power limits for the high-voltage electric bus, including the constrained battery power command; and controlling operation of the torque machines of the multimode transmission in response to the torque commands.

2. The method of claim 1, wherein executing the local expansion about one of the voltage and the current on the high-voltage electric bus using the electric power model to determine the constrained battery power command comprises employing a Taylor series expansion of the electric power model about the one of the voltage and the current on the high-voltage electric bus to determine the constrained battery power command.

3. The method of claim 2, wherein employing the Taylor series expansion of the electric power model about the voltage on the high-voltage electric bus to determine the constrained battery power command comprises:

determining a relationship of battery power with respect to voltage and current; and executing a partial derivative of the relationship of battery power with respect to voltage to determine the constrained battery power command.

4. The method of claim 3, wherein the constrained battery power command comprises a voltage-limited maximum commanded battery power when operating during a discharging event.

5. The method of claim 3, wherein the constrained battery power command comprises a voltage-limited minimum commanded battery power when operating during a charging event.

6. The method of claim 2, wherein employing the Taylor series expansion of the electric power model about the current on the high-voltage electric bus to determine the constrained battery power command comprises:

determining a relationship of battery power with respect to voltage and current; and executing a partial derivative of the relationship of battery power with respect to current to determine the constrained battery power command.

7. The method of claim 6, wherein the constrained battery power command comprises a current-limited maximum commanded battery power when operating during a discharging event.

8. The method of claim 6, wherein the constrained battery power command comprises a current-limited minimum commanded battery power when operating during a charging event.

9. The method of claim 1, comprising executing the local expansion about one of the voltage and current on the high-voltage electric bus using the electric power model to determine the constrained battery power command that avoids an overshoot of a battery pack voltage for a high-voltage battery electrically connected to the high-voltage electric bus.

10. The method of claim 1, further comprising determining a battery pack voltage for the high-voltage battery, said battery pack voltage corresponding to the battery power demand for the high-voltage battery.

11. The method of claim 1, further comprising determining a battery power demand for a high-voltage battery electrically coupled to the high-voltage electric bus based upon the constrained torque commands.

12. A method for controlling torque machines of a multimode transmission, said torque machines electrically coupled via a power inverter to a high-voltage electric bus, the method comprising:

monitoring voltage and current on a high-voltage electric bus electrically coupled to a high-voltage battery and a power inverter configured to transfer electric power to the torque machines and providing the monitored voltage and current as feedback to a control module including a feed-forward electric power model;

iteratively estimating electric power limits for the high-voltage electric bus using the feed-forward electric power model, the electric power limits including a constrained battery power command based upon a total motor torque electrical power for the torque machines, wherein the feed-forward electric power model estimation of the constrained battery power command comprises:

developing a relationship of the power of the high-voltage battery to the monitored voltage and current on the high-voltage bus; and executing a local expansion about one of the voltage and current on the high-voltage electric bus using the developed relationship of the power of the high-voltage battery and the monitored voltage and current on the high-voltage bus to determine the constrained battery power command that will place said one of the voltage and current on the high-voltage bus at a corresponding limit;

determining torque commands for the torque machines that are constrained in response to the estimated electric power limits for the high-voltage electric bus, including the constrained battery power command;

determining a battery power demand for a high-voltage battery electrically coupled to the high-voltage electric bus based upon the constrained torque commands;

determining a battery pack voltage for the high-voltage battery, said battery pack voltage corresponding to the battery power demand for the high-voltage battery; and controlling operation of the torque machines of the multimode transmission in response to the torque commands for the torque machines.

13. The method of claim 12, wherein executing the local expansion about one of the voltage and the current on the high-voltage electric bus using the electric power model to determine the constrained battery power command comprises employing a Taylor series expansion of an electric power model about the one of the voltage and current on the high-voltage electric bus to determine the constrained battery power command.

14. The method of claim 13, wherein employing the Taylor series expansion of the electric power model about the voltage on the high-voltage electric bus to determine the constrained battery power command comprises:
    determining a relationship of battery power with respect to voltage and current; and
    executing a partial derivative of the relationship of battery power with respect to voltage to determine the constrained battery power command.

15. The method of claim 14, wherein the constrained battery power command comprises a voltage-limited maximum commanded battery power when operating during a discharging event.

16. The method of claim 14, wherein the constrained battery power command comprises a voltage-limited minimum commanded battery power when operating during a charging event.

17. The method of claim 13, wherein employing the Taylor series expansion of the electric power model about the current on the high-voltage electric bus to determine the constrained battery power command comprises:
    determining a relationship of battery power with respect to voltage and current; and
    executing a partial derivative of the relationship of battery power with respect to current to determine the constrained battery power command.

18. The method of claim 17, wherein the constrained battery power command comprises a current-limited maximum commanded battery power when operating during a discharging event.

19. The method of claim 17, wherein the constrained battery power command comprises a current-limited minimum commanded battery power when operating during a charging event.

* * * * *